Figure 1:
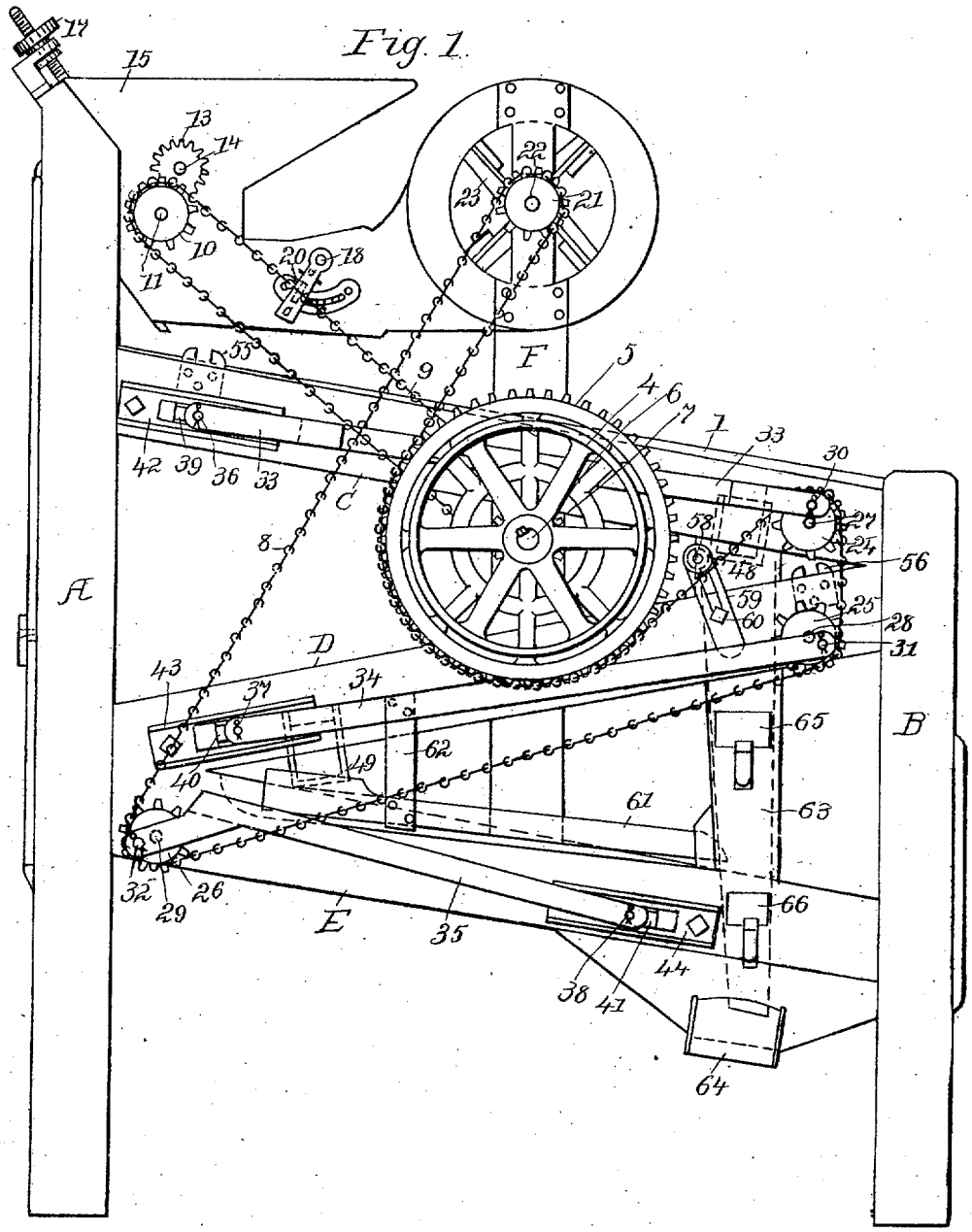

No. 884,660. PATENTED APR. 14, 1908.
J. H. HOOVER.
MACHINE FOR CLEANING AND GRADING GRAIN AND SEED.
APPLICATION FILED OCT. 23, 1905.

7 SHEETS—SHEET 1.

Witnesses
Nora Graham
Ina Graham

Inventor.
James H. Hoover.
by L. P. Graham
his attorney.

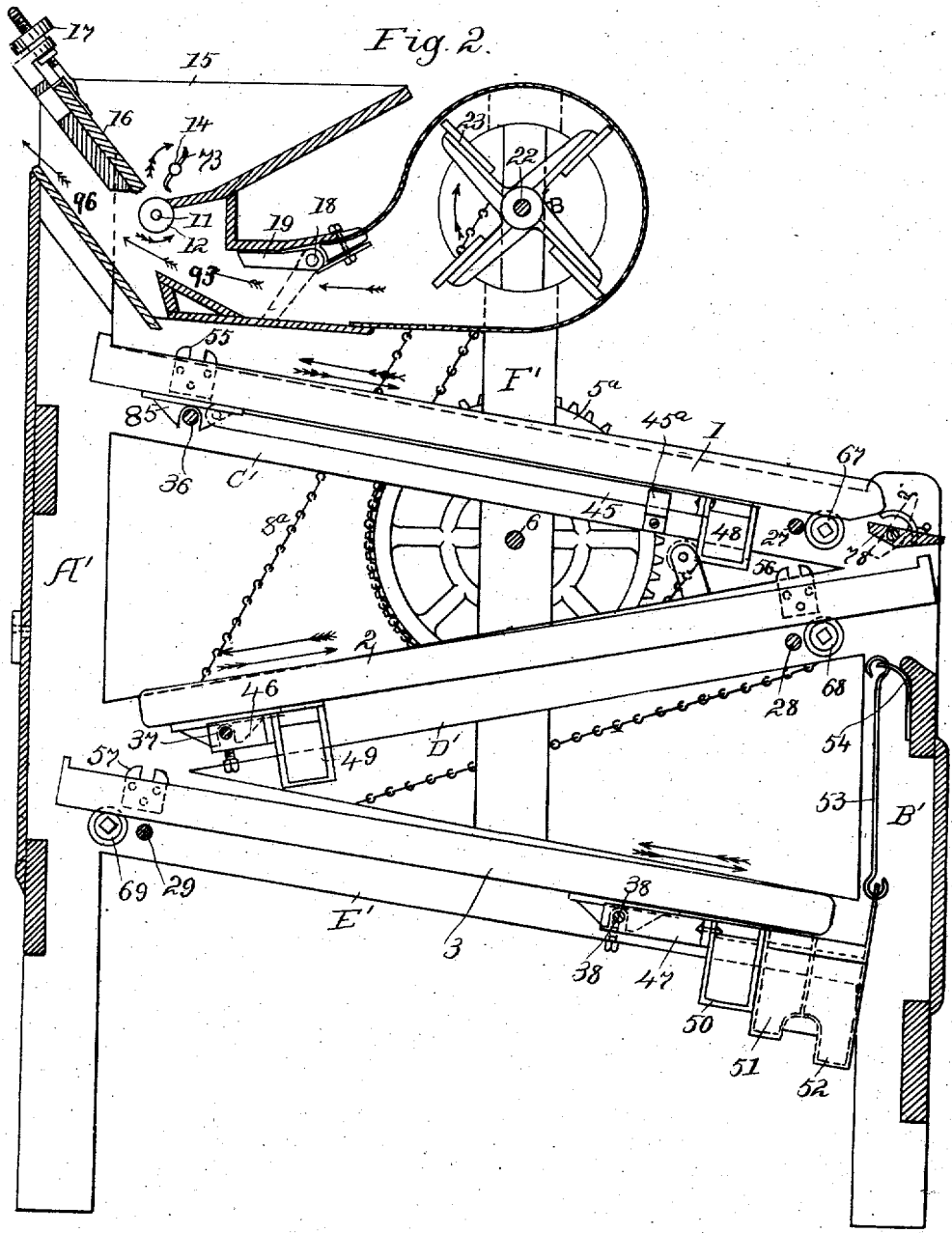

No. 884,660.  
PATENTED APR. 14, 1908.  
J. H. HOOVER.  
MACHINE FOR CLEANING AND GRADING GRAIN AND SEED.  
APPLICATION FILED OCT. 23, 1905.  
7 SHEETS—SHEET 3.
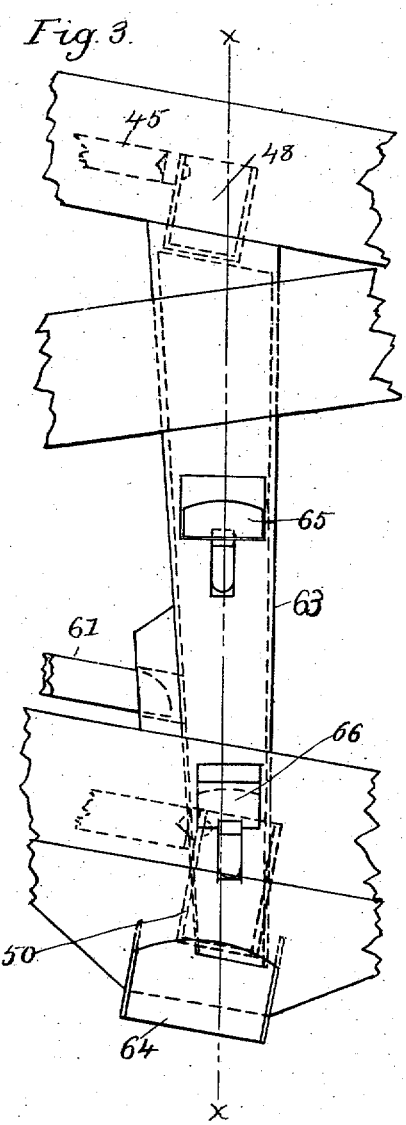
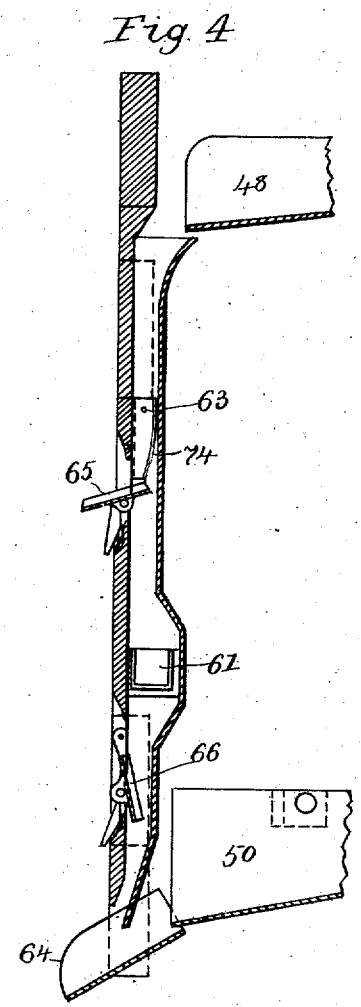
Witnesses.  
Nora Graham  
Ind Graham
Inventor  
James H. Hoover  
by L. P. Graham  
his attorney.

No. 884,660. PATENTED APR. 14, 1908.
J. H. HOOVER.
MACHINE FOR CLEANING AND GRADING GRAIN AND SEED.
APPLICATION FILED OCT. 23, 1905.
7 SHEETS—SHEET 4.
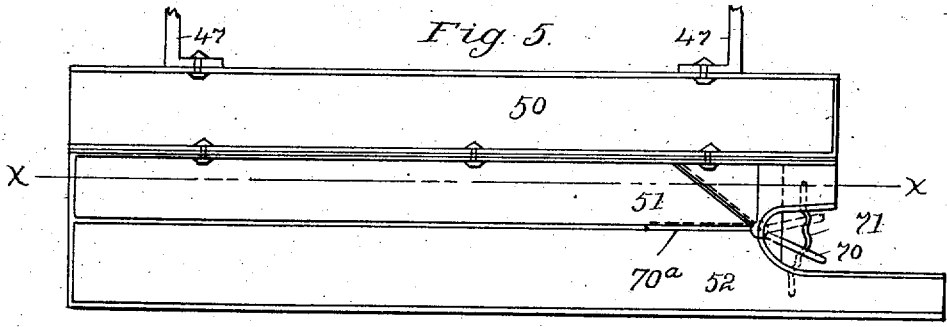
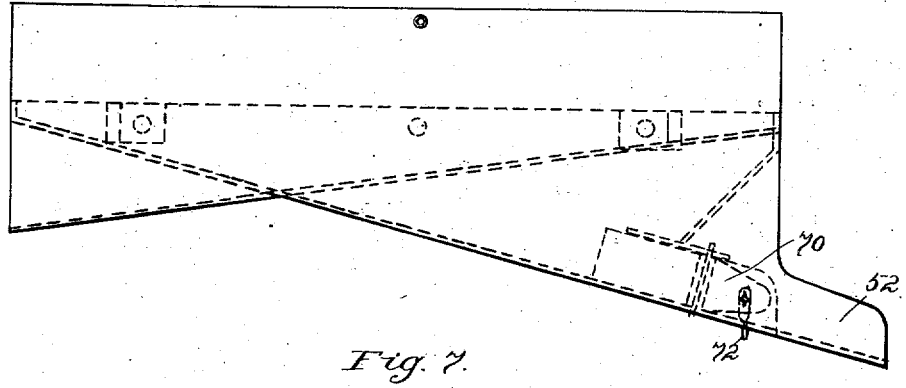
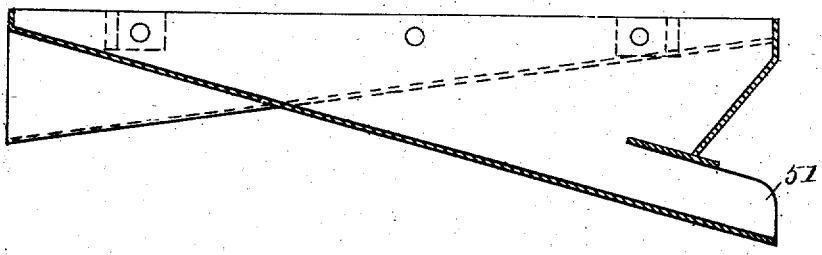
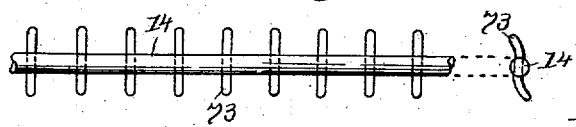
Witnesses: Inventor,
Nora Graham. James H. Hoover.
Ina Graham. by L. P. Graham
his attorney.

No. 884,660. PATENTED APR. 14, 1908.
J. H. HOOVER.
MACHINE FOR CLEANING AND GRADING GRAIN AND SEED.
APPLICATION FILED OCT. 23, 1905.
7 SHEETS—SHEET 5.
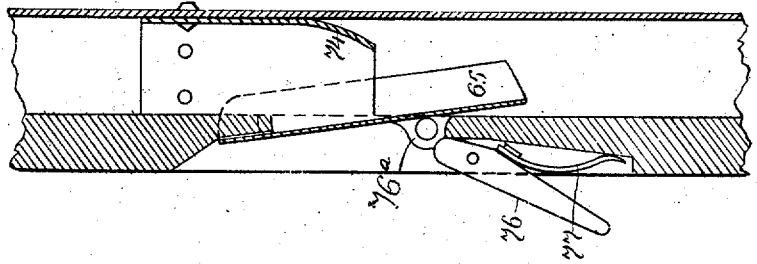
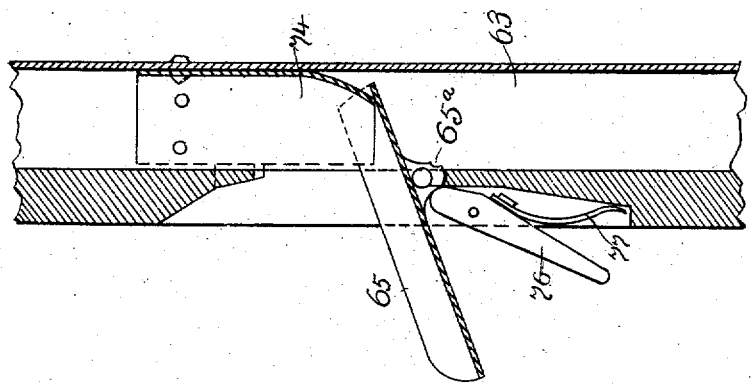
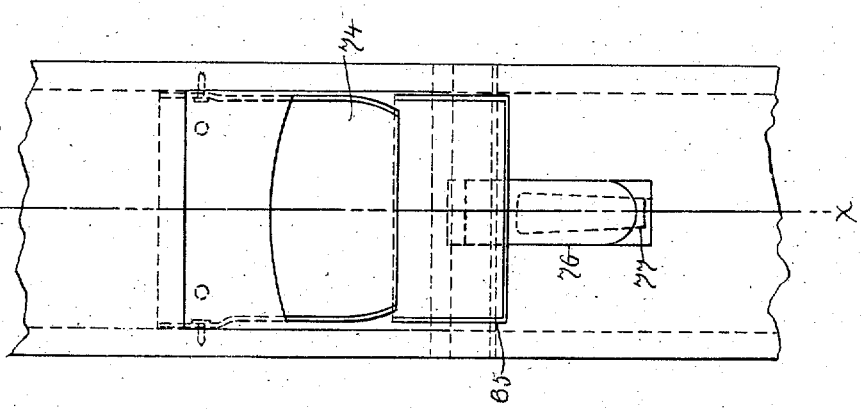
Witnesses
Nora Graham
Ina Graham
Inventor.
James H. Hoover.
by 
his attorney.

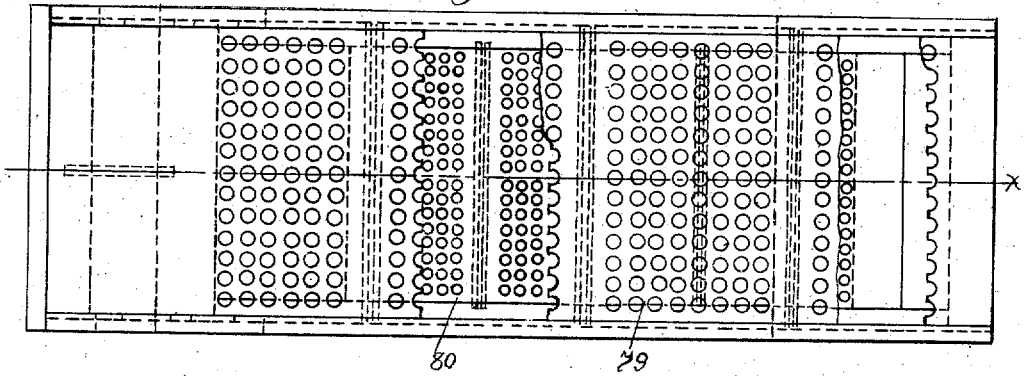
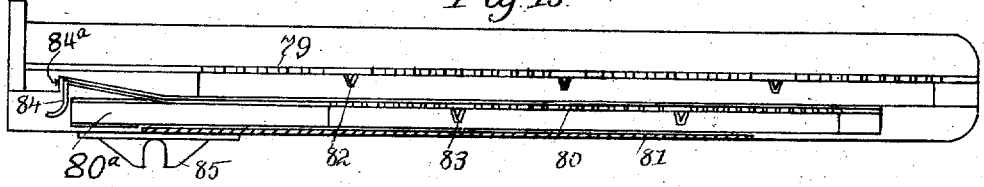
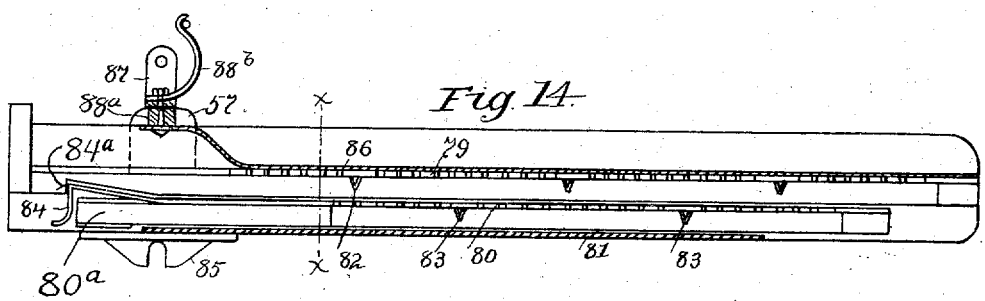
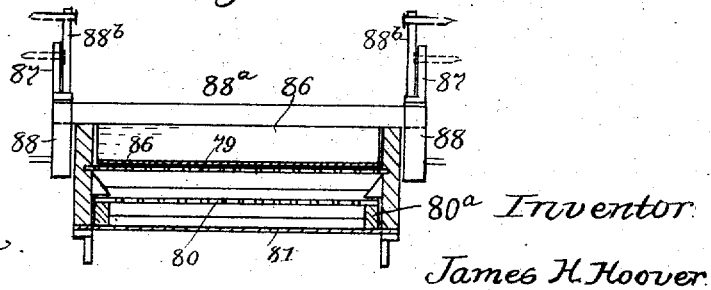

No. 884,660. PATENTED APR. 14, 1908.
J. H. HOOVER.
MACHINE FOR CLEANING AND GRADING GRAIN AND SEED.
APPLICATION FILED OCT. 23, 1905.
7 SHEETS—SHEET 7.
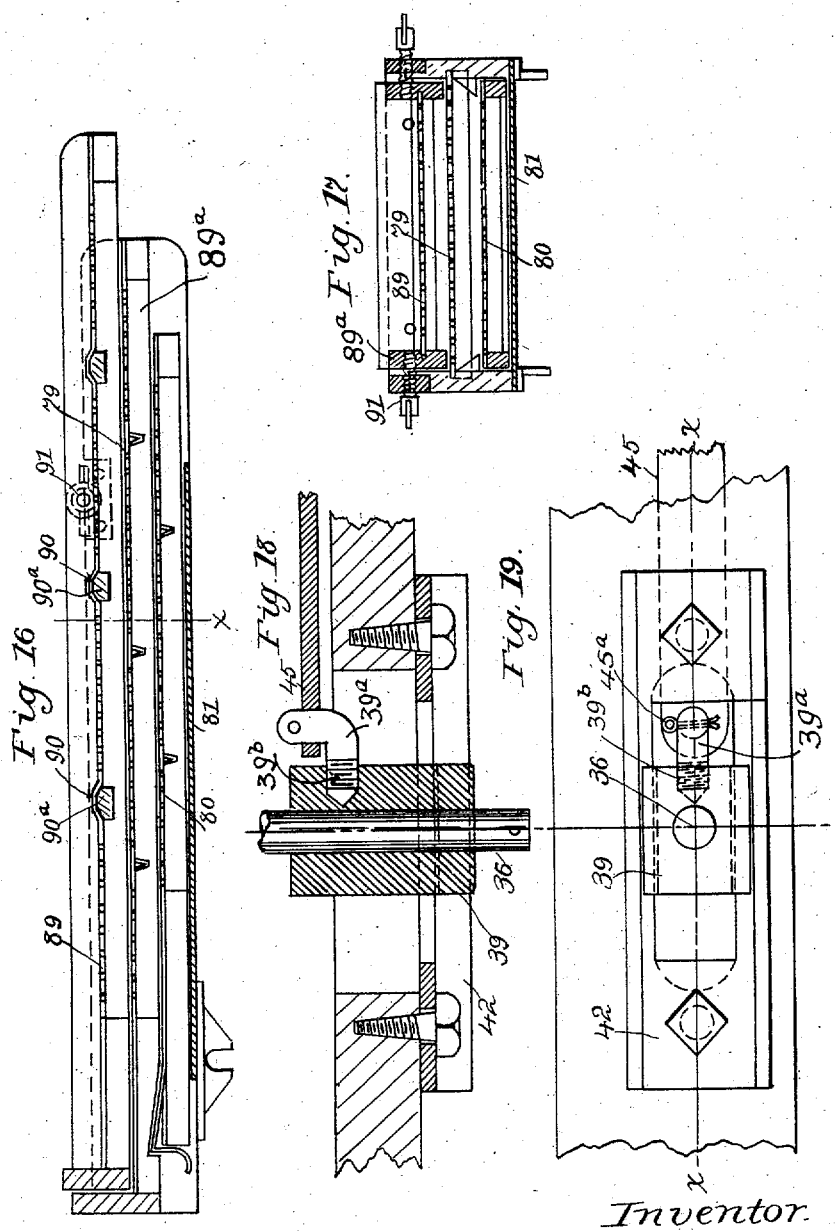
Witnesses
Nora Graham
Ina Graham
Inventor
James H. Hoover
by L. P. Graham
his attorney

UNITED STATES PATENT OFFICE.

JAMES H. HOOVER, OF DECATUR, ILLINOIS.

MACHINE FOR CLEANING AND GRADING GRAIN AND SEED.

No. 884,660.　　　Specification of Letters Patent.　　　Patented April 14, 1908.

Application filed October 23, 1905. Serial No. 284,081.

*To all whom it may concern:*

Be it known that I, JAMES H. HOOVER, a resident of the city of Decatur, county of Macon, and State of Illinois, have invented certain new and useful Improvements in Machines for Cleaning and Grading Grain and Seed, of which the following is a specification.

One object of this invention is to provide means for blowing trash, chaff and dust off the grain before submitting the same to the cleaning and grading action of the separating screens.

Another object is to provide improved means for holding the grain and trash flat on the screen surface, so that the grain may be graded with reference to length and so that long particles of trash may not turn endwise and escape through the screens with the grain.

Another object is to provide a float screen having crosswise smooth imperforate crests, or raised surfaces which will detain the grain on the perforations of the screen until it has ample time to pass therethrough and which will permit the trash to float over the crests and off the screen.

Another object is to increase the length of the screening surface in the machine by providing three separate grain shoes through which the grain passes successively and by providing each grain shoe with two screens and a solid, grain-carrying bottom.

Another object is to provide means for directing the screenings from all the screens to a single discharge outlet, or down spout, and providing intercepting shoes which may be used to keep the different screenings separate or be put out of use with the result that several grades may be discharged together.

Another object is to provide a force feed that will supply the grain to the screens at a uniform rate and that will arrange the straw and litter in proper position to pass the feed slot.

Another object is to facilitate travel of grain along the conveyer troughs, by giving the troughs the same motion as the screens, and an incidental object is to keep the troughs separated from the screens so that interchange of screens will not interfere with the troughs.

Another object is to provide a lateral trough running from the trough of the intermediate grain chute to the down spout, to complete the facilities for conveying all desirable products of the machine to the one discharge outlet.

Another object is to provide a skeleton frame from which all moving parts may be sustained, and still further objects will appear from the detailed description.

In the drawings forming part of this specification Figure 1 is a side elevation of the machine. Fig. 2 is a vertical section just outside the grain shoes. Fig. 3 is a detail, in side elevation, of the down spout. Fig. 4 is a section on line X in Fig. 3. Fig. 5 is a detail plan of the three conveyer troughs at the discharge end of the lower screen. Fig. 6 is a side elevation of the conyever troughs shown in Fig. 5. Fig. 7 is a section on line X in Fig. 5. Fig. 8 is a detail in plan and end projection of the feed roller and fingers that are used to arrange the trash for passing through the feed slot. Fig. 9 is an elevation of an enlarged detail of one of the intercepting chutes of the down spout, showing the mechanism used to manipulate the shoes. Fig. 10 is a section on line X in Fig. 9, showing the chute swung down to a grain-discharging position. Fig. 11 is a section similar to Fig. 10, showing the intercepting shoe raised to an inoperative position. Fig. 12 is a plan of one of the grain shoes, the upper screen thereof being broken away in parts to expose the lower screen. Fig. 13 is a section on line X in Fig. 12, showing the vertical arrangement of the screens and the solid bottom of the shoe. Fig. 14 is a section similar to Fig. 13, with the flexible screen cover added. Fig. 15 is a cross section through the screens the bottom and the flexible cover, on line X in Fig. 14. Fig. 16 is a longitudinal section through a grain shoe, showing the chute provided with a float screen having smooth, imperforate cross crests. Fig. 17 is a cross section on line X through Fig. 16. Fig. 18 is a section on line X in Fig. 19, and Fig. 19 is a detail elevation of the mechanism used to convey motion from one of the shake rods to one of the cross troughs of the screens.

The frame consists of four corner posts, A, B, A', B', three pairs of side pieces, C, C', D, D', E, E', and a pair of uprights F, F'. The posts support the machine, and the side pieces and uprights provide surfaces to which the various parts of the machine may be attached. The uprights provide bearings for the main shaft and for the fan shaft and also tend to strengthen the general structure.

The side pieces are arranged obliquely, in a zigzag manner, and each pair is in line with one of the grain shoes, or screen frames.

The upper grain shoe 1 has a longitudinal reciprocating motion between the side pieces C, C', the intermediate grain chute 2 has a similar motion between the side pieces D, D', and the lower grain chute 3 has the same motion between the side pieces E, E'.

The main shaft 6 extends from side to side of the machine and through bearings in the uprights F F'. Sprocket wheels 5 and 5ª are placed one on each end of the main shaft, and near one end of the shaft is placed a smaller sprocket wheel 7 and a drive pulley 4. Chains 8 and 8ª run against wheels 5 and 5ª and drive the fan and the grain shoes, while the chain 9 runs around sprocket wheel 7 and drives the feed roller and the agitator.

The hopper 15 has a slot in the lower part of its bottom, through which the grain is discharged, and the feed roller 12 forms a side of the slot. The shaft 11 of the feed roller has bearings in the sides of the hopper and has on one of its projecting ends a sprocket wheel 10, through which it is rotated by chain 9. The shaft 11 also has a gear wheel located behind the sprocket wheel, which meshes with the gear wheel 13 on the agitator shaft. The agitator comprises the rotatable shaft 14, which is located above and in front of the feed slot, and the fingers 73, which are curved backward at their ends, with relation to the direction of rotation, or revolution.

The feed board for the hopper is shown at 16, and at 17 is shown a feed screw by means of which the feed board is moved nearer to or farther from the feed roller, thus regulating the size of the feed slot or passage way.

A valve 19 in the wind passage adapted to enlarge or diminish the passage is swung on shaft 18 and closes downward; and a lock handle 20, shown in Fig. 1, provides means for holding the valves in various positions.

The roller 12 turns in a direction to carry the grain through the slot and the agitator turns in a direction to carry the grain toward the slot and arrange the sticks and trash lengthwise of the slot. As the roller is below the slot and the agitator is above the slot one must be turned in a direction opposite the direction of rotation of the other, and I accomplish this by gearing the shaft of the roller to the shaft of the agitator by direct spur gearing.

Immediately below the hopper is the wind passage, which is contracted blow-pipe style, and to the rear of the hopper is the fan 23 by means of which the current of wind is created. The fan shaft 22 is journaled in uprights F, F', and it has a sprocket wheel 21 which is driven by a chain 8. The bottom of the air passage is inclined upward as shown at 95 and a more steeply inclined board 96 is placed to the front of the incline 95. A space is left between the two inclines for the passage of grain and said space is as narrow as proper operation of the machine will permit.

The upper end of the upper grain shoe 1 is below the wind passage and in position to receive grain falling from the hopper. It is supported at one end upon rollers 67 and at the other end upon the shake rod 36. The shake rod is carried at each end in a slide boxing 39, which has a reciprocating motion in a slide way 42, secured to side pieces C and C' of the frame. The side pieces of the frame are slotted to permit the reciprocating motion of the boxings of the shake rods. A shaft 27 is journaled in side pieces C and C' near the rear end of the frame, sprocket wheels 24 are fastened one onto each end of the shaft 27 and a crank pin 30 is formed on each of the sprocket wheels 24. A pitman rod 33 is used on each side of the machine to connect the crank pin 30 with shake rod 36, and whenever the shaft 27 is rotated the shake rod and the grain shoe mounted thereon are given their operative motion.

A trough 48 extends across the discharge end of the solid bottom of the grain shoe 1, it is inclined to bring one end lower than the other and it is attached to the rear ends of a pair of bars 45, one of which is shown in Fig. 2. The bars 45 connect with the slide boxings of the shake rod 36, as is shown in detail in Fig. 18, and at their opposite ends they are rigidly secured to the trough 48. Brackets 45ª, one of which is shown in Fig. 2, form slidable supports for the ends of bars 45 supporting the trough.

By preference the connection between bars 45 and boxings 39 is detachable and adjustable in any suitable manner, but as shown I employ L-shaped screws 39ª whose threaded ends 39ᵇ take into the boxings while their other ends stand at right angles and project through holes in the bars, suitable devices 45ª such as cotter pins being employed to hold them detachably in said holes. To adjust, the screws are detached from the bars and turned on their threads, after which they are again connected with the bars.

A down spout 63 is formed on a side of the machine near the rear end thereof, and through the side pieces of the frame. Grain falling from the lower end of trough 48 enters the upper end of the down spout, see Fig. 4, and is subsequently controlled in a manner to be hereinafter explained.

The grain shoe 2 is supported at one end on the shake rod 37 and at the other end on rollers 68. The shake rod is carried at each end in a slide boxing 40, which has a reciprocating motion in a slide way 43. The shaft 28, journaled in side pieces D, D', has sprocket wheels 25 on its ends and the sprocket wheels have crank pins 31. Pitman rods 34 connect the shake rod 37 with the crank pins 31 and provide means for reciprocating the grain shoes 2. A trough 49 extends crosswise of shoe 2, beneath the lower end of the solid bottom of the shoe, and it is sustained by bars 46 which extend from the shake rod 37. The trough 49 is lower at one end than at the other and its lower end discharges into a trough 61 which extends rearward from trough 49 and is inclined downward. The trough 61 is sustained from pitman rod 34 by means of a bar 62, which is rigidly attached to the pitman rod and to the trough. The trough 61 discharges into the down spout 63.

The grain shoe 3 is supported at one end upon shake rod 38 and at the other end upon rollers 69. The shake rod 38 is carried at each end in a slide boxing 41 which has reciprocating motion in a slide way 44. A shaft 29, journaled in side pieces E, E', has sprocket wheels 26 on its ends and the sprocket wheels have crank pins 32 on their outer faces. Pitman rods 35 connect the crank pins 32 with the shake rod 38 and provide means for imparting reciprocating motion to the grain shoe 3. A trough structure comprising the three troughs or channels 50, 51 and 52, is supported from a spring bracket 54 by a swinging rod 53 and it is connected with the shake rod 38 by means of connecting bars 47. Grain is discharged from the solid bottom of grain shoe 3 into trough 50, from the lower screen into trough 51 and from the upper screen into trough 52. The trough 50 discharges at the lower end of the down spout and the other two troughs are in this instance diverted to discharge on the opposite side of the machine.

The down spout 63 has an edge opening for trough 61 and it has tilt boards 65 and 66 which may be used to intercept grain from the upper trough 48 or from the side trough 61. In Figs. 9, 10, and 11 the tilt-board 65 is shown in detail and its mode of operation is illustrated, as follows: The tilt-board is swung between its ends on a pivot flush with the inner surface of the spout and when its discharge end is raised to the position shown in Fig. 11 the passage way of the down spout is clear. In order to hold the tilt-board in a raised position the rounded pivot bearings 65ª are notched as at 76ª and a hand lever, or dog, 76, is pivoted in position for one of its ends to engage the notches of the pivot bearing of the tilt-board. A spring 77 holds the engaging end of the hand lever 76 in yielding engagement with the bearing of the tilt-board and when it is desired to open or close the tilt-board the pressure of the spring is overcome and the necessary shift is made. When the tilt-board is swung into the position shown in Fig. 10, grain from trough 48 will be intercepted and discharged from a side of the down spout, instead of out of the bottom thereof. The tilt-board 66 is equipped and operated the same as the tilt-board 65, and each should have a guide way 74 to direct the grain properly into the receiving end of the tilt-board, when the tilt-board is turned down.

Each of the grain shoes comprises a solid bottom and two screen surfaces, although a large advantage can be obtained by the use of a single screen in each shoe when said shoe is operated in the manner hereinafter described. The upper screen extends further than the lower screen and the lower screen overlaps the solid bottom, as shown in Figs. 13, 14, and 16 of the drawings. The shoes are arranged in the form of a zigzag and the discharge of the grain from the screens is so arranged that grain not passing through the screens will travel from the upper end of the upper shoe to the lower end of the lower shoe on a screen surface. In other words, grain may be subjected to screening action for the entire length of all the shoes. The upper screens 79 and the solid bottoms 81, are permanently attached to the sides of the shoes, and the lower screen 80 of each pair is attached to a frame 80ª which may be slid into and out of the shoe, for purposes of interchange. To secure the frame of the lower screen into the shoe frame, a spring catch 84 is fastened to the slidable frame and shaped to spring into a notch 84ª in the shoe frame. The spring catch is inclined upward, then bent abruptly downward and then curved to form a finger hold, as shown in the drawings. The perforations of the upper screen of each shoe are preferably larger than in the lower screen. The screens are sustained at intervals along their length by cross ribs 82 and 83, so that all parts of each screen surface will closely approach the same general plane, and above each sustaining rib the screens are left blank, or imperforate, so that the grain will not drift above the ribs.

To provide for throwing off sticks, chips, bits of broken weeds and particles of broken straw, as well as to provide for grading grain according to length, I furnish the upper screen of a shoe with a flexible cover, 86, of considerable weight and hold the cover from moving with the screen. Linoleum has been found to make a satisfactory cover for the screen, and other substances may doubtless be used. In Figs. 14 and 15 a pair of stationary brackets are shown at 88 and these are notched to receive the ends of cross bar 88ª, which crosses the shoe frame just above the upper surface thereof. The flexible cover 86 is attached to the under surface of the cross bar 88ª and it extends the entire length of the screen along the upper surface thereof. The ends of the cross bar are held removably in place by a pair of swinging buttons 87. The buttons rest normally above the ends of the cross bar and are held yieldingly in place by springs 88$^b$. When it is desired to remove the cover, the buttons are swung aside, the cross bar is lifted out of the notches of the brackets and the cover is removed. The cover holds the grain and other substances with all longest dimensions in contact with the screen and it prevents long, narrow grains or particles from tilting up endwise and passing through the meshes, or perforations, of the screen. Grains and particles short enough to pass through the perforations will be separated from the longer particles and the latter will be carried off the tail of the screen. By holding the cover from moving with the screen the travel of the material on the screen is facilitated and increased, as the cover prevents the grain &c. from returning upward with the screen and does not materially retard its downward, or tailward, motion. The screen motion is in a straight line, as the slots through which one end of a screen is supported are in line with the pulleys by which the other end is supported, and so there is no disturbance of the contact between the screen and the separately-fastened cover as the screen is reciprocated.

To screen grain that is unusually trashy, I use the auxiliary screen 89, shown in Figs. 16 and 17. This screen has imperforate surfaces 90 which extend at intervals crosswise of the screen. With this screen the grain is detained in the depressions behind the crests or raised surfaces until it has ample opportunity to pass through the perforations of the screen, while the trash and large, foul seed will float over the smooth imperforate crests and off the screen. The screen with the crests supported by ribs 90$^a$ is set in a frame 89$^a$ that is adapted to be slid lengthwise to place above the screens ordinarily used, and set screws 91 are used to retain the auxiliary screen in place.

A tilt board 78, shown in Fig. 2, is extended crosswise of the machine at the discharge end of the grain shoe 1, and it is pivoted between its edges in the sides of the machine. The tilt board may occupy the position shown in solid lines, in which case it will divert the discharge from the top screen of the upper shoe clear of the machine, or it may stand in the position shown in dotted lines and will then carry the discharge from the upper screen of the upper shoe to the upper end of the upper screen of the intermediate shoe. Whenever the top screen is used as a float to carry off trash, the tilt board is held in the position shown in solid lines; at other times it is held in its other position.

To enable the flexible screen cover to be applied to each of the shoes if it is to partake of its movement, I provide a pair of notched brackets 55, 56 and 57 for each shoe.

The notched brackets 85, shown in Figs. 13 and 14, are adapted to connect the grain shoe with the shake rod of the machine. They provide a simple and easy attachment.

A chain tightener comprises a roller 58 carried on an end of the slotted arm 59, and a bolt 60 to secure the slotted arm to the side piece D. A chain tightener is used for each chain 8 and 8$^a$. A gate 70$^a$ may form part of the partition dividing wall between troughs 51 and 52, as shown in Fig. 5, and a handle 70 may be shifted from one notch to another in spring rod, or rack bar, 71, to hold the gate in place. When the gate is swung to the position shown in dotted lines the grain in the two troughs may be discharged together as one grade.

The crank pins on the sprocket wheels 24, 25, and 26 are set out of time with each other so that the grain shoes will reciprocate out of unison.

By running the drive chains with one surface against the drive sprocket and the other surface against the driven sprockets, as shown in Fig. 1, the life of the chain is prolonged.

Grain to be cleaned and graded is supplied to hopper 15. The main shaft 6 is turned by force applied to pulley 4, the sprocket wheels on the main shaft turn with the shaft, and the chains transmit motion to the grain shoes, to the fan and to the feed roller. The feed roller forms the lower edge of the discharge slot of the hopper and it tends to carry the grain, trash &c. through the slot by frictional contact. The revolving fingers on the shaft in the hopper tend to arrange the long particles with their ends presented to the slot, so that they will readily yield to the feeding action of the roller. As the grain and trash fall from the hopper they enter the wind passage and are at once subjected to the air blast that is applied crosswise of the falling grain, as shown by the arrows in Fig. 2. The air blast relieves the grain of all light particles of trash and the heavier particles fall with the grain onto the upper end of the top screen of the upper grain shoe, where the mechanical cleaning and grading begins. The air blast is diverted upward by first incline 95 and follows the second or steeper inclined surface 96. The heavier grains fall more or less directly through the blast while the lighter trash is carried up incline 96 and clear of the machine. Grains of lighter weight are carried up the steeper incline 96 to a greater or less extent, the exceedingly light ones may be carried over, and the remainder will strike the incline and slide down to the passageway between the inclines. The first incline 95 acts as a barrier to prevent the grain running back into the horizontal part of the air tube, in addition to acting as a blast-diverter, and the grain is submitted to a weighing action by the wind while the blast is directed entirely through the machine and clear thereof, as a result of the construction and arrangement of the inclines 95 and 96.

Ordinarily the top screen of the upper shoe will be a float screen, or a screen provided with imperforate crosswise crests, (Fig. 16) and this will float off substantially all the trash. Grain falling through the top screen is arrested, temporarily at least, by the second screen, in which the perforations are usually smaller, and seed small enough to pass through the perforations of the second screen is diverted by gravity down the inclined solid bottom of the top shoe to the trough 48, whence it is delivered to the down spout. Grain passing over the tail of the screening surfaces of the upper shoe falls onto the upper end of the upper screen of the intermediate shoe, where it is subjected to a second, or to a continued grading, with the result that the smallest seed reaches the solid bottom, is delivered to trough 49, passed to trough 61 and finally delivered to the down spout. Grain falling from the screening surfaces of the intermediate grain shoe is delivered to the upper end of the upper screen of the lower shoe. Here the final act of cleaning and grading is performed in the same manner as hereinbefore described, with the exception that the grain from the upper screen and the lower screen is delivered to troughs 52 and 51, respectively, while the grain from the solid bottom is discharged into trough 50.

A well defined grade of grain is delivered to each of the troughs 48 and 49 and these may be kept separate if desired by opening the intercepting tilt-boards 65 and 66, as hereinbefore explained. In case it should be desired to maintain but three grades, the intercepting tilt-boards are left closed and the accumulations of troughs 48, 49 and 50 are all discharged together. Where grain is badly inter-mixed and where the demand for accurate and precise grading is sufficient to make it pay to hold the different grades separately, the larger number of grades is desirable.

What I claim is,—

1. In a machine for cleaning and grading grain and seed, the combination of three grain shoes disposed in a zigzag, each shoe being provided with a screen surface and a solid bottom, and placed so that grain will travel from the screen surface of one shoe to the screen surface of the next lower shoe in its downward passage, a trough under the discharge end of each solid bottom, means for reciprocating the shoes and the troughs, a down spout to which the grain from the solid bottoms is carried, and intercepting tilt-boards in the down spout adapted to throw out of said spout grain from either the upper or the intermediate solid bottom.

2. In a machine of the character described, the combination with shoes and screens, troughs leading therefrom, and a down spout into which the latter deliver the screenings at various heights; of tilt-boards mounted in said spout under certain of the troughs, guideways fixed in the troughs and directing the screenings toward said tilt-boards, notched pivot bearings for said tilt-boards, and spring actuated dogs adapted to engage said notches.

3. In a machine of the character described, the combination with shoes and screens, troughs leading therefrom, and a down spout into which the latter deliver the screenings at various heights; of tilt-boards mounted in said spout under certain of the troughs, notched pivot bearings for said tilt-boards, and spring-actuated dogs adapted to engage said notches.

4. In a machine of the character described, the combination with a shoe and screen, a shake rod, and its boxing; of a trough under the shoe, a bar attached thereto, a screw threaded at one end into said boxing having its other end passing through said bar, and means for holding the last-mentioned end detachably in place.

5. In a machine of the character described, the combination with a shoe and screen, a shake rod, and its boxing; of a trough under the shoe, a bar attached thereto, an L-shaped screw threaded at one end into the boxing and having its other end passing through a hole in said bar, and a cotter pin taking through the last-mentioned end beyond the bar.

In testimony whereof I sign my name in the presence of two subscribing witnesses.

JAMES H. HOOVER.

In the presence of—
  L. P. GRAHAM,
  ROSA VOELCKER.